US012025456B2

(12) United States Patent
Davis et al.

(10) Patent No.: US 12,025,456 B2
(45) Date of Patent: Jul. 2, 2024

(54) SYSTEM AND METHOD TO DISPLAY AIRPORT MOVING MAP AND TAXI ROUTING GUIDANCE CONTENT

(71) Applicant: Rockwell Collins, Inc., Cedar Rapids, IA (US)

(72) Inventors: Jason Davis, Marengo, IA (US); Marcin Kolesinski, Central City, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 401 days.

(21) Appl. No.: 17/215,290

(22) Filed: Mar. 29, 2021

(65) Prior Publication Data

US 2022/0307853 A1 Sep. 29, 2022

(51) Int. Cl.
*G01C 21/34* (2006.01)
*B64D 43/02* (2006.01)
(Continued)

(52) U.S. Cl.
CPC ......... *G01C 21/3492* (2013.01); *B64D 43/02* (2013.01); *G01C 21/3629* (2013.01);
(Continued)

(58) Field of Classification Search
CPC ............................ G01C 21/3492; G06N 20/00
See application file for complete search history.

(56) References Cited

U.S. PATENT DOCUMENTS

| 6,784,869 B1 | 8/2004 | Clark et al. |
| 6,995,746 B2 | 2/2006 | Aymeric |
| | (Continued) | |

FOREIGN PATENT DOCUMENTS

| AU | 7815800 A1 | 4/2001 |
| CN | 109754643 A | 5/2019 |
| | (Continued) | |

OTHER PUBLICATIONS

Extended Search Report in European Application No. 22165221.7 dated Sep. 7, 2022, 10 pages.
(Continued)

*Primary Examiner* — Peter D Nolan
*Assistant Examiner* — Jacob Kent Besteman-Street
(74) *Attorney, Agent, or Firm* — Suiter Swantz IP

(57) ABSTRACT

A system may include a display and a processor. The processor may be configured to: output a view of an airport moving map (AMM), the AMM depicting a location of an aircraft on an airport surface; receive aircraft state data and airport surface data, wherein the airport surface data includes information of the airport surface, wherein the aircraft state data includes a current position of the aircraft; generate taxi routing guidance content, wherein the taxi route data includes information of a taxi route for the aircraft on the airport surface, wherein the taxi routing guidance content includes graphical and/or audio content to be presented to a flight crew to guide the aircraft along the taxi route, wherein the taxi routing guidance content further includes an approaching runway annunciation, wherein the approaching runway annunciation indicates that the aircraft is approaching a runway; and output the taxi routing guidance content.

10 Claims, 8 Drawing Sheets

(51) Int. Cl.
    *G01C 21/36*      (2006.01)
    *G06F 3/14*      (2006.01)
    *G06N 5/04*      (2023.01)
    *G06N 20/00*      (2019.01)
    *G08G 5/00*      (2006.01)

(52) U.S. Cl.
    CPC ........... *G01C 21/3691* (2013.01); *G06F 3/14* (2013.01); *G06N 5/04* (2013.01); *G06N 20/00* (2019.01); *G08G 5/0004* (2013.01)

(56) References Cited

U.S. PATENT DOCUMENTS

| | | | |
|---|---|---|---|
| 7,212,890 | B2 | 5/2007 | Lafon et a |
| 7,286,062 | B2 | 10/2007 | Feyereisen et al. |
| 7,375,678 | B2 | 5/2008 | Feyereisen et al. |
| 7,499,794 | B1 | 3/2009 | Bailey et al. |
| 7,965,223 | B1 | 6/2011 | McCusker |
| 7,974,773 | B1 | 7/2011 | Krenz et al. |
| 8,019,529 | B1 | 9/2011 | Sharma et al. |
| 8,159,416 | B1 | 4/2012 | Yum et al. |
| 8,193,948 | B1 | 6/2012 | Shapiro et al. |
| 8,234,066 | B2 | 7/2012 | Wipplinger et al. |
| 8,306,745 | B1 | 11/2012 | Clark et al. |
| 8,433,459 | B2 | 4/2013 | Michel et al. |
| 8,560,214 | B1 | 10/2013 | Krenz et al. |
| 8,698,654 | B2 | 4/2014 | He |
| 8,786,467 | B2 | 7/2014 | Clark et al. |
| 9,000,952 | B1 | 4/2015 | VanDerKamp et al. |
| 9,046,369 | B2 | 6/2015 | Chytil et al. |
| 9,174,744 | B2 | 11/2015 | Depape et al. |
| 9,189,964 | B1 | 11/2015 | Rathinam et al. |
| 9,222,800 | B1 | 12/2015 | Scherer et al. |
| 9,347,794 | B1 | 5/2016 | Tiana et al. |
| 9,389,082 | B2 | 7/2016 | Dhulipudi et al. |
| 9,487,304 | B1 | 11/2016 | Bowen et al. |
| 9,517,844 | B2 | 12/2016 | Khatwa et al. |
| 9,527,601 | B2 | 12/2016 | Wyatt et al. |
| 9,561,865 | B2 | 2/2017 | Marczi et al. |
| 9,718,558 | B2 | 8/2017 | Ball et al. |
| 9,779,630 | B2 | 10/2017 | Auletto et al. |
| 9,786,467 | B2 | 10/2017 | Iijima |
| 9,799,225 | B2 | 10/2017 | Lueck et al. |
| 10,140,876 | B2 | 11/2018 | Khatwa et al. |
| 10,168,876 | B2 | 1/2019 | Kaprani et al. |
| 10,234,303 | B1 | 3/2019 | Chandrashekarappa et al. |
| 10,789,854 | B1 | 9/2020 | Kolesinski |
| 2008/0106438 | A1 | 5/2008 | Clark et al. |
| 2010/0194601 | A1 | 8/2010 | Servantie et al. |
| 2010/0250030 | A1 | 9/2010 | Nichols et al. |
| 2010/0283636 | A1 | 11/2010 | Clark et al. |
| 2012/0194556 | A1 | 8/2012 | Schmitt et al. |
| 2013/0231853 | A1 | 9/2013 | Feyereisen et al. |
| 2014/0278037 | A1 | 9/2014 | Choksi et al. |
| 2014/0303815 | A1 | 10/2014 | Lafon et al. |
| 2016/0063869 | A1* | 3/2016 | Kathirvel ............. G08G 5/0008 701/3 |
| 2016/0152348 | A1 | 6/2016 | Mohideen et al. |
| 2016/0180720 | A1* | 6/2016 | Auletto ................. G01C 23/00 701/533 |
| 2016/0343262 | A1 | 11/2016 | Auletto et al. |
| 2017/0083206 | A1 | 3/2017 | He et al. |
| 2018/0181299 | A1 | 6/2018 | Ouellette et al. |
| 2018/0357911 | A1 | 12/2018 | Chartier et al. |
| 2019/0004318 | A1 | 1/2019 | Descheemaeker et al. |
| 2019/0043164 | A1 | 2/2019 | He |
| 2019/0066523 | A1 | 2/2019 | Pesik et al. |
| 2019/0172361 | A1* | 6/2019 | Schwindt ............. G08G 5/0021 |
| 2019/0228668 | A1 | 7/2019 | Wang et al. |
| 2020/0152071 | A1 | 5/2020 | Schwindt |

FOREIGN PATENT DOCUMENTS

| | | |
|---|---|---|
| CN | 110826788 A | 2/2020 |
| EP | 0880827 A1 | 12/1998 |
| EP | 2000778 B1 | 11/2010 |
| EP | 2610590 B1 | 10/2015 |
| EP | 3200171 A1 | 8/2017 |
| EP | 3446984 A1 | 2/2019 |
| EP | 3476743 A1 | 5/2019 |
| GB | 1592780 A | 7/1981 |
| JP | 1990204787 A | 8/1990 |
| JP | 1994168001 A | 6/1994 |
| WO | 1998052174 A1 | 11/1998 |
| WO | 2007146520 A2 | 12/2007 |

OTHER PUBLICATIONS

Hiltunen, Danielle et al. "Cockpit display of traffic information (CDTI) and airport moving map industry survey." (2016). Federal Aviation Administration.

EP Communication dated Feb. 26, 2024; European Application No. 22165221.7.

Gillian Clare et al. "Optimization of Taxiway Routing and Runway Scheduling", IEEE Transactions on Intelligent Transportation Systems, IEEE, Piscataway, NJ, USA, vol. 12, No. 4, Dec. 1, 2011, pp. 1000-1013.

* cited by examiner

SYSTEM AND METHOD TO DISPLAY AIRPORT MOVING MAP AND TAXI ROUTING GUIDANCE CONTENT

BACKGROUND

Currently, flight crew members spend significant amounts of time determining a taxi route while on airport surfaces, which can detract from the flight crew's ability to perform other flight tasks. Flight crews benefit from being able to easily navigate airports to determine where an aircraft is and where the aircraft needs to go. Additionally, current implementations of approaching runway features fail to cover real-world situations, such as parallel taxiways or curved taxiways leading to runways.

SUMMARY

In one aspect, embodiments of the inventive concepts disclosed herein are directed to a system. The system may include a display and a processor communicatively coupled to the display. The processor may be configured to: output, to the display, a view of an airport moving map (AMM), the AMM depicting a location of an aircraft on an airport surface; receive aircraft state data and airport surface data, wherein the airport surface data includes information of the airport surface, wherein the aircraft state data includes a current position of the aircraft; based on taxi route data, the aircraft state data, and the airport surface data, generate taxi routing guidance content, wherein the taxi route data includes information of a taxi route for the aircraft on the airport surface, wherein the taxi routing guidance content includes graphical and/or audio content to be presented to a flight crew to guide the aircraft along the taxi route, wherein the taxi routing guidance content further includes an approaching runway annunciation along the taxi route, wherein the approaching runway annunciation indicates that the aircraft is approaching a runway; and output, to the display, the taxi routing guidance content. The display may be configured to: present the view of the AMM; and present the taxi routing guidance content.

In a further aspect, embodiments of the inventive concepts disclosed herein are directed to a method. The method may include: outputting, by a processor to a display, a view of an airport moving map (AMM), the AMM depicting a location of an aircraft on an airport surface, wherein the processor is communicatively coupled to the display; receiving, by the processor, aircraft state data and airport surface data, wherein the airport surface data includes information of the airport surface, wherein the aircraft state data includes a current position of the aircraft; based on taxi route data, the aircraft state data, and the airport surface data, generating, by the processor, taxi routing guidance content, wherein the taxi route data includes information of a taxi route for the aircraft on the airport surface, wherein the taxi routing guidance content includes graphical and/or audio content to be presented to a flight crew to guide the aircraft along the taxi route, wherein the taxi routing guidance content further includes an approaching runway annunciation along the taxi route, wherein the approaching runway annunciation indicates that the aircraft is approaching a runway; outputting, by the processor to the display, the taxi routing guidance content; presenting, by the display, the view of the AMM; and presenting, by the display, the taxi routing guidance content.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
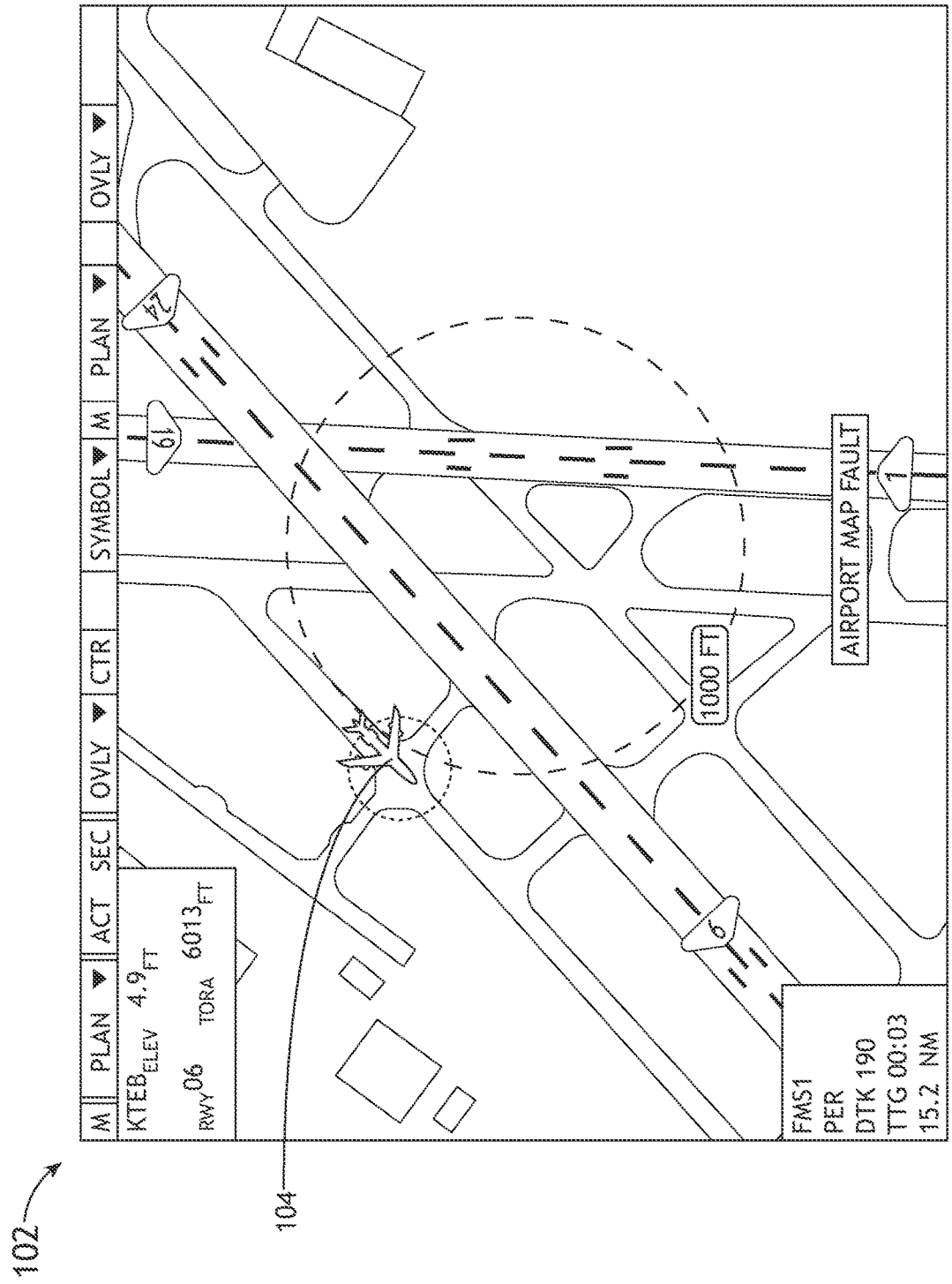
FIG. 1 is an exemplary view of an AMM of an exemplary embodiment according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following:

A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein may be directed to a system and a method configured to present a view of an AMM and taxi routing guidance content.

Some embodiments include use of a taxi route (e.g., an instructed taxi route or a predicted taxi route) along with a current aircraft position along the taxi route to determine when to provide an "approaching runway" annunciation to the crew. Some embodiments may provide a more robust functionality of the approaching runway feature functionality to alert the crew to nearing runways in more instances than just a straight-line approach. Informing the crew of approaching runways reduces the risk of unintentionally entering runways.

Referring now to FIG. 1, an exemplary embodiment of an exemplary view 102 of an AMM according to the inventive concepts disclosed herein is depicted. The AMM may include a depiction of an aircraft 104. The AMM may utilize a multi-function window (MFW) map window to provide a more detailed view of airport map data (e.g., at ranges below 2 NM). Often, flight crews will utilize the AMM 102 map ranges (e.g., less than 2 NM) to provide a detailed representation of an airport during ground operations. As shown in FIG. 1, the view 102 of the AMM has an exemplary map range. The AMM may provide a given level of detail within the map based on a selected map range (e.g., automatically declutters or clutters map details based on the selected map range). One of the features provided by the AMM 102 is the ability to determine when the aircraft's 104 ownship track is projected to intersect with a boundary(ies) of a runway and provide an annunciation (e.g., an approaching runway annunciation) to the crew to this effect.

In some embodiments, airport surface database(s) may include airport surface data, which includes information of an airport surface. Such airport surface databases may include the Airport Surface Database (ASDB) and/or the Airport Surface Routing Network (ASRN). For example, the ASRN is a data set containing "nodes" identifying the location and various other characteristics of navigable airport surface features (such as taxiway-taxiway intersections, runway-taxiway intersections, parking stands, etc.) and "edges" providing information how nodes are interconnected from a navigation standpoint. This information can be used to construct possible paths or routes from one location to another at a given airport.

Currently, an aircraft's ownship track projection is a straight line extending some distance from a nose of such aircraft, and the aircraft's ownship track projection does not cover all possible scenarios that would correlate with real-world situations, such as situations involving parallel taxiways and/or curved taxiways leading to a runway.

Some embodiments may include using a taxi route (e.g., an instructed taxi route or a predicted taxi route), aircraft state data, and airport surface data to generate taxi routing guidance content.

Figure 3:
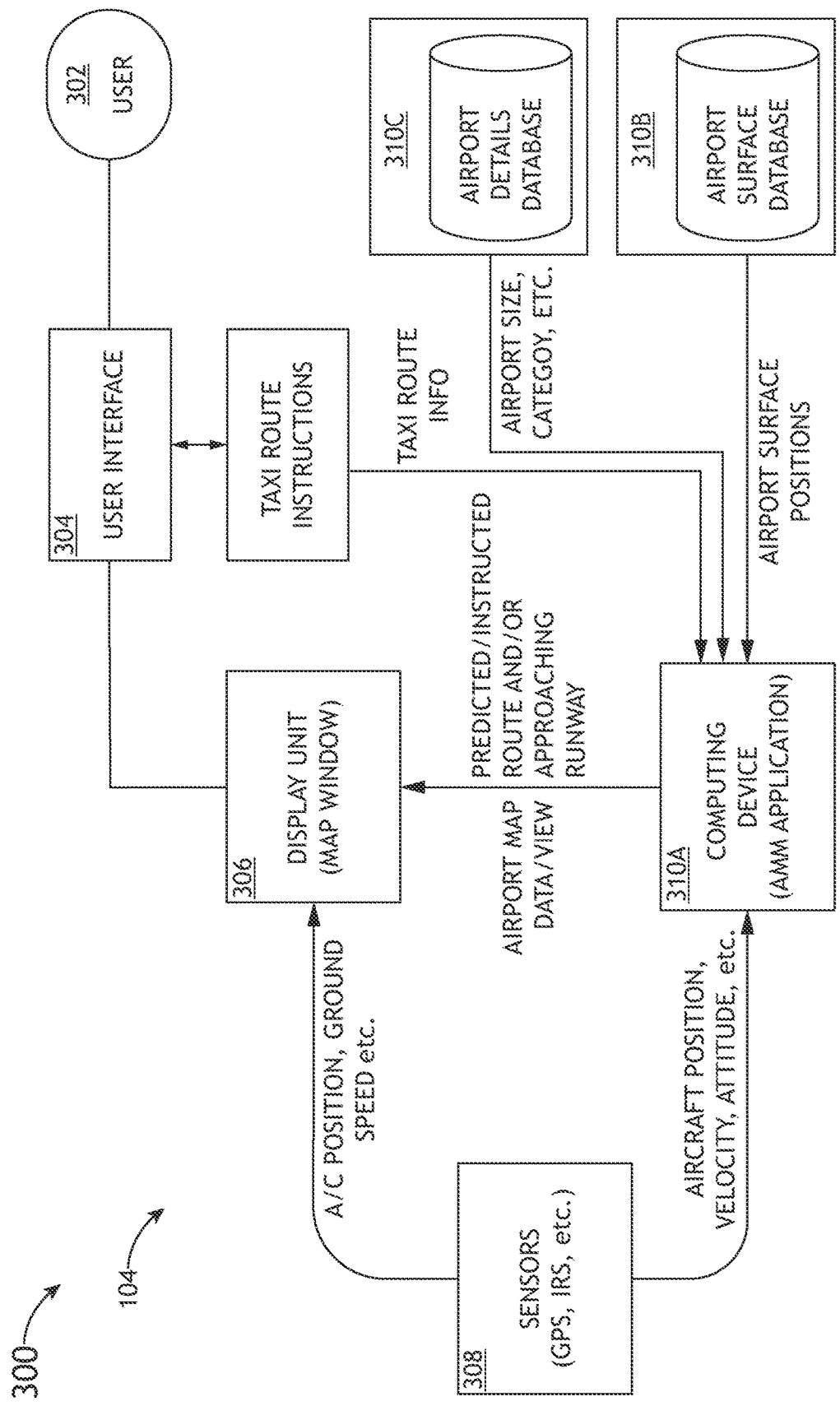
FIG. 3 is a view of an exemplary embodiment of a system including an aircraft according to the inventive concepts disclosed herein.

Some embodiments may include using an instructed (e.g., an intended) taxi route that has been provided by ground control entered into the aircraft's computing device(s), and combining the instructed taxi route with airport surface data (e.g., ASRN data). The instructed taxi route may be entered via any suitable means, such as via a datalink and/or by interfacing with a user interface system (e.g., 304, as shown in FIG. 3) (e.g., via voice, eye tracking, keyboard entry, mouse, and/or trackpad). Combining the instructed taxi route with the information provided in airport surface data may allow for taxi routing guidance. For example, by using a known current aircraft position and a known instructed taxi route, at least one processor may generate and provide a crew taxi routing guidance content, which may include at least one approaching runway annunciation. For example, the approaching runway annunciation may indicate that the aircraft 104 is approaching a runway along the instructed taxi route, which is accurate even if the instructed taxi route traverses and/or is proximate to parallel taxiways, curves, etc.

Some embodiments may include using a predicted taxi route. For example, in the absence of direct turn-by-turn taxi routing information to determine approaching runway annunciations, a predicted taxi route may be used as part of a more desirable solution. For example, by using airport surface data (e.g., from ASDB and/or ASRN) with various ownship data parameters (e.g., position, direction, speed, braking, aircraft size, aircraft weight, aircraft category, and/or typical/common taxi routes taken by these types of aircraft), some embodiments may be capable of predicting a most likely taxi route the aircraft 104 will or should take. With the most likely taxi route determined, the system may initiate an approaching runway alert to be presented to the crew at appropriate times. At any given time, the system can determine a proximate node(s) in the ASRN (e.g., where the aircraft 104 is relative to ASRN data points). For example, by using this information, the system can determine the predicted taxi route at least in part by determining all possible valid maneuvers emanating from that node, by traversing the ASRN.

For example, determining all possible valid maneuvers emanating from that node may include: (a) following each edge from each node, while computing a metric for each route (e.g., a total distance, or a total estimated time based upon other data such as maneuvering speeds or distances); (b) avoiding edges which cause the route to traverse the same node a second time (e.g., to avoid circular routes); and/or (c) constraining each node by only following edges within bounds of the aircraft's 104 orientation and maneuvering capabilities (e.g. if the aircraft's 104 heading is North, then a South edge can be disregarded).

Processing for a given possible taxi route may be complete when the system determines whether the given possible taxi route will or will not trigger an approaching runway alert (e.g., if the cumulative route length exceeds a defined threshold distance for alerting, or the cumulative time-to-intercept computed along the route exceeds a defined threshold duration, an alert would not be triggered based upon this particular route). In an opposite case, where a possible taxi route has been identified that, if taken, would result in the cumulative route length and/or time-to-intercept to be less than a defined threshold, an alert would be triggered, notifying the pilot of the approaching runway.

Some embodiments may include other methods of determining a predicted taxi route, for example, to reduce a number of possible taxi routes to consider and/or to avoid nuisance alerts. For example, determining a predicted taxi route may include: comparing possible taxi routes to a list of typically used taxi routes; and if the possible taxi route is not among this list, a shorter distance or time-to-intercept could be used. For example, determining a predicted taxi route may include the use of artificial intelligence, neural network, and/or machine learning operations (e.g., determining the probability of a given possible taxi route being taken and/or using a weighting factor to dynamically adjust the distance and/or time-to-intercept thresholds).

In at least one embodiment, AI, neural networks, or other machine learning algorithms may be employed to refine the relationships between an arbitrary set of input parameters and a set of outputs. Relevant data may also be logged and correlated to provide context for later process steps. AI and machine learning in general, and neural networks in particular, employ processing layers organized in a feed forward architecture where neurons (nodes) only receive inputs from the previous layer and deliver outputs only to the following layer, or a recurrent architecture, or some combination thereof. Each layer defines an activation function, comprised of neuron propagation functions, such as a Hyperbolic tangent function, a linear output function, and/or a logistic function, or some combination thereof. AI and machine learning in general, and neural networks in particular, utilize supervised learning conducted during the design phase to establish weighting factors and activation functions for each node. During supervised training, a designer may adjust one or more input biases or synaptic weights of the nodes in one or more processing layers of the neural network according to a loss function that defines an expected performance. Alternatively, or in addition, the designer may utilize certain training data sets, categorized as selection data sets, to choose a predictive model for use by the neural networks. During unsupervised training, the neural network adjusts one or more input biases or synaptic weights of the nodes in one or more processing layers according to an algorithm. In at least one embodiment, where the training data sets include both stable and unstable approaches, the training algorithm may comprise a first component to minimize disparity with approaches labeled "stable" and a second component to prevent close approximation with approaches labeled "unstable." A person skilled in the art may appreciate that maximizing disparity with unstable approaches may be undesirable until the neural network has been sufficiently trained or designed so as to define constraints of normal operation within which both stable and unstable approaches are conceivable. In at least one embodiment, training data sets may be categorized based on a defined level of stability or instability, and provided in ascending order of convergence such that the disparities between stable and unstable approaches diminish during training and necessary adjustments presumably become smaller over time according to first and second order deviations of the corresponding loss function. The loss function may define error according to mean square, root mean square, normalized square, a weighted square, or some combination thereof, where the gradient of the loss function may be calculated via backpropagation.

Figure 2:
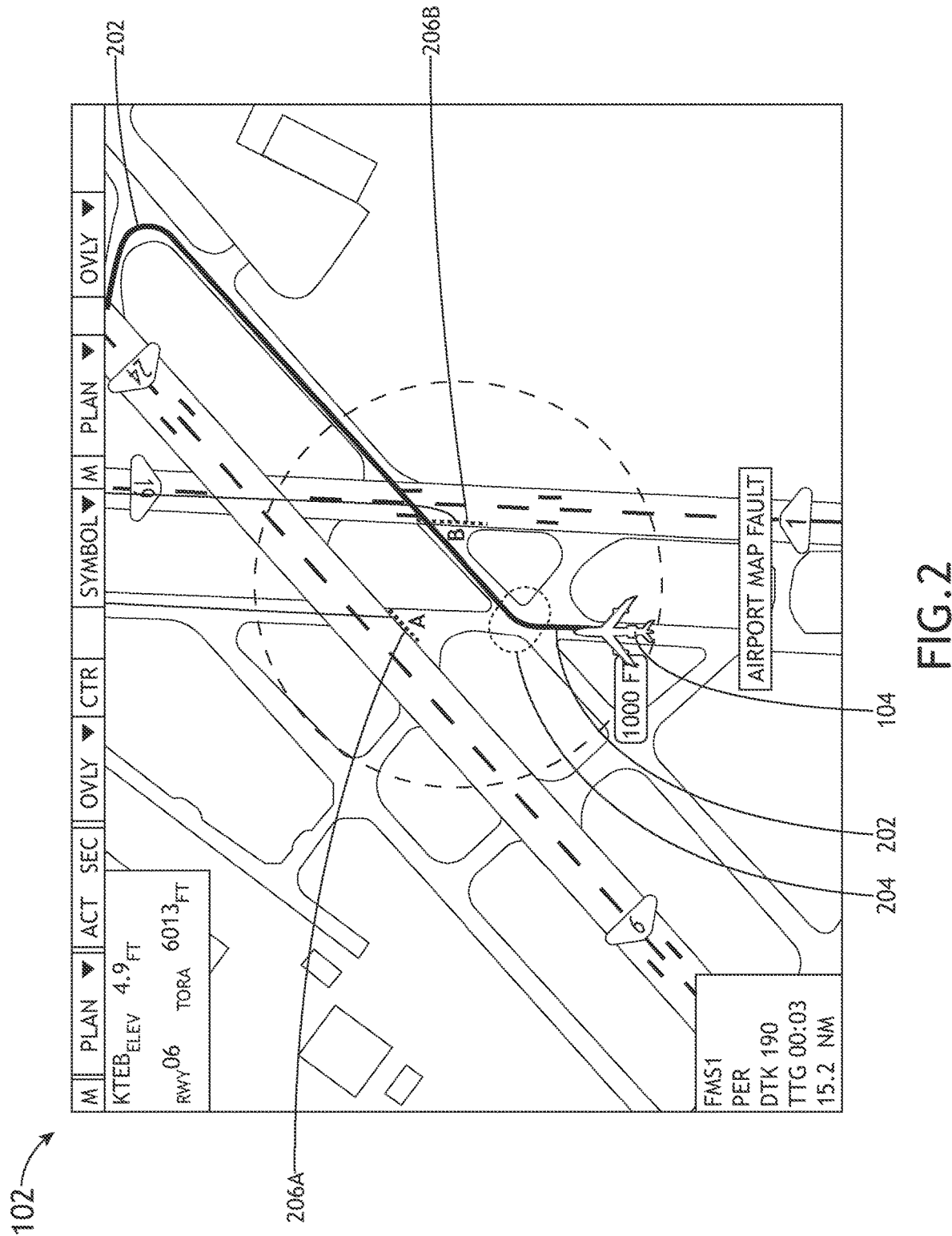
FIG. 2 is a further exemplary view of an AMM of an exemplary embodiment according to the inventive concepts disclosed herein.

Referring now to FIG. 2, an exemplary embodiment of an exemplary view of the AMM for an exemplary situation according to the inventive concepts disclosed herein is depicted. As shown, the AMM shows the aircraft 104, a taxi route 202 (e.g., an instructed taxi route or a predicted taxi route), an intersection 204, and runway boundaries 206A, 206B. In this example, aircraft 104 is headed approximately north on the taxi route 202, which includes curves. With respect to the intersection 204 (e.g., a taxiway intersection), current systems (e.g., using existing approaching runway indication logic) may trigger an approaching runway annunciation for the runway boundary 206A (e.g., identifying that RWY 06/24 is being approached along the current track or direction of travel with the boundary at dotted line "A"); however, runway boundary 206A is not along the taxi route 202, and therefore, such an unneeded approaching runway annunciation may distract the flight crew. Rather, the taxi route 202 shows that the approaching runway indication should be triggered when within an appropriate predefined range of runway boundary 206B (e.g., to cross RWY 01/19) while following the taxi route 202, regardless of current track or direction of travel at the shown current position of the aircraft 104.

Figure 4:
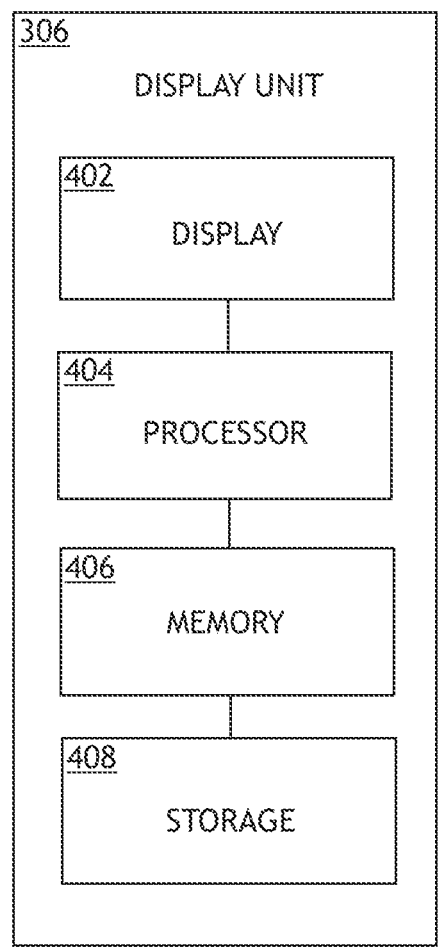
FIG. 4 is a view of an exemplary embodiment of the display unit computing device of FIG. 3 according to the inventive concepts disclosed herein.
Figure 5:
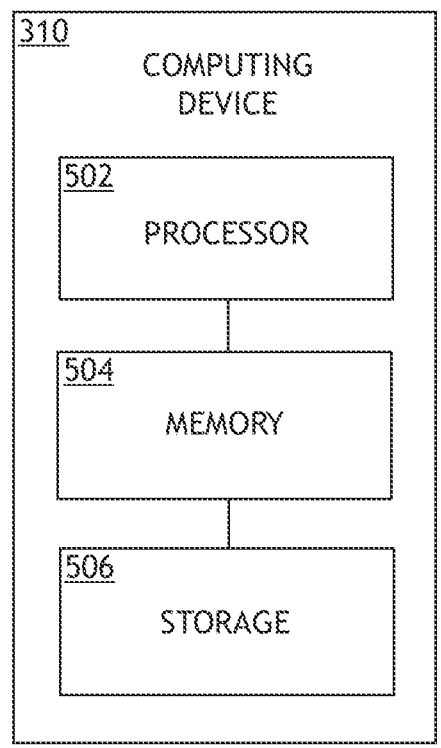
FIG. 5 is a view of an exemplary embodiment of a computing device of FIG. 3 according to the inventive concepts disclosed herein.

Referring now to FIGS. 3, 4 and 5, an exemplary embodiment of a system 300 according to the inventive concepts disclosed herein is depicted. In some embodiments, the system 300 may include ground control (e.g., air traffic control (not shown)) and the aircraft 104, which may include at least one user 302, at least one user interface 304, at least one display unit computing device 306, sensors 308, at least one computing device 310A, at least one computing device 310B, and/or at least one computing device 310C, some or all of which may be communicatively coupled at any given time. In some embodiments, the at least one display unit computing device 306, the at least one computing device 310A, the at least one computing device 310B, and/or the at least one computing device 310C may be implemented as a single computing device or any number of computing devices configured to perform any or all of the operations disclosed throughout.

The user 302 may be a pilot or crew member. The user 302 may be configured to interface with the system via the user interface 304, for example, to engage, disengage, or override automatic changes to map ranges for the AMM and/or to enter information regarding an instructed taxi route. The at least one user interface 304 may be implemented as any suitable user interface, such as a touchscreen (e.g., of the display unit computing device 306 and/or another display unit), a multipurpose control panel, a cursor control panel, a keyboard, a mouse, a trackpad, a button, a switch, an eye tracking system, and/or a voice recognition system. The user interface 304 may be configured to receive a user selection and to output the user selection to a computing device (e.g., the display unit computing device 306).

The display unit computing device 306 may be implemented as any suitable computing device, such as an MFW computing device. As shown in FIG. 4, the display unit computing device 306 may include at least one display 402, at least one processor 404, at least one memory 406, and/or storage 408, some or all of which may be communicatively coupled at any given time. The processor 404 may be configured to run various software applications (e.g., a map window application) or computer code stored (e.g., maintained) in a non-transitory computer-readable medium (e.g., memory 406 and/or storage 408) and configured to execute various instructions or operations. The processor 404 may be configured to perform any or all of the operations disclosed throughout. For example, the processor 404 may be configured to: receive sensor data from the sensors 308; execute the map window application; receive data and views of the AMM 102; receive taxi route data (e.g., instructed taxi route data or predicted taxi route data); receive approaching runway annunciations; receive taxi routing guidance content; output the views of the AMM to the display 402; and/or output the taxi routing guidance content to the display 402. The display 402 may be configured to: present the view of the AMM; and/or present the taxi routing guidance content.

The sensors 308 may be any suitable sensors configured to output sensor data to another computing device (e.g., 306, 310A, and/or 310B). For example, the sensors 308 may include any or all of the following: at least one global positioning system (GPS) sensor; at least one inertial reference system (IRS) sensor; at least one throttle position sensor; at least one aircraft position sensor; at least one groundspeed sensor; and/or any other sensors commonly installed in aircraft. The sensors 308 may be configured to output sensor data (e.g., aircraft position and/or speed) to some or all of the computing devices (e.g., 306, 310A, 310B, and/or 310C).

The computing device 310A may be implemented as any suitable computing device, such as an AMM computing device. As shown in FIG. 5, the computing device 310A may include the elements of the computing device 310 and may include at least one processor 502, at least one memory 504, and/or at least one storage 506, some or all of which may be communicatively coupled at any given time. The processor 502 may be configured to run various software applications (e.g., an AMM application) or computer code stored (e.g., maintained) in a non-transitory computer-readable medium (e.g., memory 504 and/or storage 506) and configured to execute various instructions or operations. The processor 502 of the computing device 310A may be configured to perform any or all of the operations disclosed throughout. For example, the processor 502 of the computing device 310A may be configured to: receive sensor data from the sensors 308; receive aircraft state data and/or airport surface data; execute the AMM application; receive taxi route data; receive ownship data parameters (e.g., from the computing device 310C); generate data and views of an AMM; output, to the at least one display (e.g., 402), a view of an AMM, the AMM depicting a location of the aircraft 104 on an airport surface; based at least on the taxi route data, the aircraft state data, and the airport surface data, generate taxi routing guidance content, wherein the taxi route data includes information of a taxi route 202 for the aircraft 104 on the airport surface, wherein the taxi routing guidance content includes at least one of graphical or audio content to be presented to a flight crew to guide the aircraft 104 along the taxi route 202; and/or output (e.g., to the at least one display 402) the taxi routing guidance content. In some embodiments, the taxi routing guidance content may include the taxi route 202 (e.g., an instructed taxi route or a predicted taxi route), runway boundaries (e.g., 206A, 206B), textual guidance directions, arrows indicating to turn or move straight, at least one approaching runway annunciation, and/or audible cues or directions.

In some embodiments, the aircraft state data includes the sensor data, is derived from the sensor data, or includes some sensor data and is derived from at least one other portion of the sensor data. For example, the aircraft state data may include information of at least one of: an aircraft position relative to the airport surface or a ground speed of the aircraft 104.

The computing device 310B may be implemented as any suitable computing device, such as an airport surface database computing device. As shown in FIG. 5, the computing device 310B may include the elements of the computing device 310 and may include at least one processor 502, at least one memory 504, and/or at least one storage 506, some or all of which may be communicatively coupled at any given time. The processor 502 may be configured to run various software applications (e.g., a database application) or computer code stored (e.g., maintained) in a non-transitory computer-readable medium (e.g., memory 504 and/or storage 506) and configured to execute various instructions or operations. The processor 502 of the computing device 310B may be configured to perform any or all of the operations disclosed throughout. For example, the processor 502 of the computing device 310B may be configured to output airport surface data (which may be stored in the memory 504 and/or storage 506 of the computing device 3106) to the computing device 310A.

The computing device 310C may be implemented as any suitable computing device, such as an aircraft details database computing device. As shown in FIG. 5, the computing device 310C may include the elements of the computing device 310 and may include at least one processor 502, at least one memory 504, and/or at least one storage 506, some or all of which may be communicatively coupled at any given time. The processor 502 may be configured to run various software applications (e.g., a database application) or computer code stored (e.g., maintained) in a non-transitory computer-readable medium (e.g., memory 504 and/or storage 506) and configured to execute various instructions or operations. The processor 502 of the computing device 310C may be configured to perform any or all of the operations disclosed throughout. For example, the processor 502 of the computing device 310C may be configured to output ownship data parameters (which may be stored in the memory 504 and/or storage 506 of the computing device 3106) to the computing device 310A. For example, the ownship data parameters may include a current position of the aircraft 104, a ground speed of the aircraft 104, a direction of the aircraft 104, braking parameters of the aircraft 104, a size of the aircraft 104, a weight of the aircraft 104, an aircraft category of the aircraft 104, and/or common routes taken by other aircraft of a same category as the aircraft 104. For example, aircraft categories may include any or all of the following: military aircraft (e.g., likely heading to or from hangars or other areas of the airport associated with military use; general aviation aircraft (e.g., likely heading to or from hangars or terminals typically used by general aviation aircraft; business aircraft (e.g., likely heading to or from a fixed base operator (FBO) area, such as a corporate jet likely heading to or from a corporate hangar; commercial aircraft (e.g., likely heading to or from a commercial terminal); carrier specific aircraft (e.g., a given airline aircraft likely heading to or from a terminal associated with the given airline; and/or cargo aircraft (e.g., likely going to or from cargo terminals, such as may be associated with a given cargo carrier (e.g., FedEx or UPS).

For example, at least one processor (e.g., the at least one processor 404, the at least one processor 502 of the computing device 310A, the at least one processor 502 of the computing device 310B, and/or the at least one processor 502 of the computing device 310C) may be configured to perform (e.g., collectively perform, if more than one processor) any or all of the operations disclosed throughout.

In some embodiments, the at least one processor (e.g., the at least one processor 404, the at least one processor 502 of the computing device 310A, the at least one processor 502 of the computing device 310B, and/or the at least one processor 502 of the computing device 310C) may be configured to perform (e.g., collectively perform, if more than one processor) to perform any or all of the following: output, to the at least one display 402, a view of an airport moving map (AMM), the AMM depicting a location of an aircraft 104 on an airport surface; receive aircraft state data and airport surface data, wherein the airport surface data includes information of the airport surface, wherein the aircraft state data includes a current position of the aircraft 104, a ground speed, and/or a direction; based at least on taxi route data, the aircraft state data, and the airport surface data, generate taxi routing guidance content, wherein the taxi route data includes information of a taxi route 202 (e.g., an instructed taxi route or a predicted taxi route) for the aircraft 104 on the airport surface, wherein the taxi routing guidance content includes at least one of graphical or audio content to be presented to a flight crew to guide the aircraft 104 along the taxi route 202; and/or output, to the at least one display 402, the taxi routing guidance content.

In some embodiments, the taxi routing guidance content further includes at least one approaching runway annunciation along the taxi route 202, wherein each of the at least one approaching runway annunciation indicates that the aircraft 104 is approaching a runway. In some embodiments, the airport surface includes parallel runways, wherein the taxi route 202 includes at least one curve, wherein the at least one approaching runway annunciation ignores a given runway in front of the aircraft if the given runway is not along the taxi route 202.

In some embodiments, the at least one processor (e.g., the at least one processor 404, the at least one processor 502 of the computing device 310A, the at least one processor 502 of the computing device 310B, and/or the at least one processor 502 of the computing device 310C) may be configured to determine a predicted taxi route 202 based at least on the airport surface data and ownship data parameters, wherein the ownship data parameters include the current position of the aircraft 104, a ground speed of the aircraft 104, a direction of the aircraft 104, braking parameters of the aircraft 104, a size of the aircraft 104, a weight of the aircraft 104, an aircraft category of the aircraft 104, and/or common routes taken by other aircraft of a same category as the aircraft 104. In some embodiments, the airport surface data includes information of nodes and edges, wherein the at least one processor being configured to determine the predicted taxi route includes the at least one processor being configured to: determine possible valid maneuvers for possible valid taxi routes based at least on at least one proximate node proximate to the current position of the aircraft 104. In some embodiments, the at least one processor being configured to determine possible valid maneuvers for possible valid taxi routes further includes the at least one processor being configured to: follow first edges connected to the at least one proximate node and subsequent edges connected back to the first edge via intervening edges such that the possible valid taxi routes are formed; and compute at least one metric (e.g., at least one of: a total distance of a given possible valid taxi route or a total estimated time to traverse the given possible valid taxi route) for each of the possible valid taxi routes. In some embodiments, the at least one processor being configured to determine the possible valid maneuvers for possible valid taxi routes further includes the at least one processor being configured to: avoid edges that would cause the aircraft to traverse a given node a second time. In some embodiments, the at least one processor being configured to determine the possible valid maneuvers for possible valid taxi routes further includes the at least one processor being configured to: only following edges within bounds of the aircraft's 104 orientation and maneuvering capabilities; and determine whether each of the possible valid taxi routes would trigger an approaching runway alert, wherein triggering the approaching runway alert occurs if (a) a cumulative route length of a given possible valid taxi route exceeds a defined threshold distance or (b) a cumulative time-to-intercept for the given possible valid taxi route exceeds a defined threshold duration.

In some embodiments, the at least one processor is further configured to determine the predicted taxi route at least by: comparing possible valid taxi routes to a predetermined list of typically used taxi routes.

In some embodiments, the at least one processor is configured to determine the predicted taxi route at least by: using at least one of artificial intelligence, neural network, or machine learning operations, such as exemplarily disclosed throughout.

Figure 6:
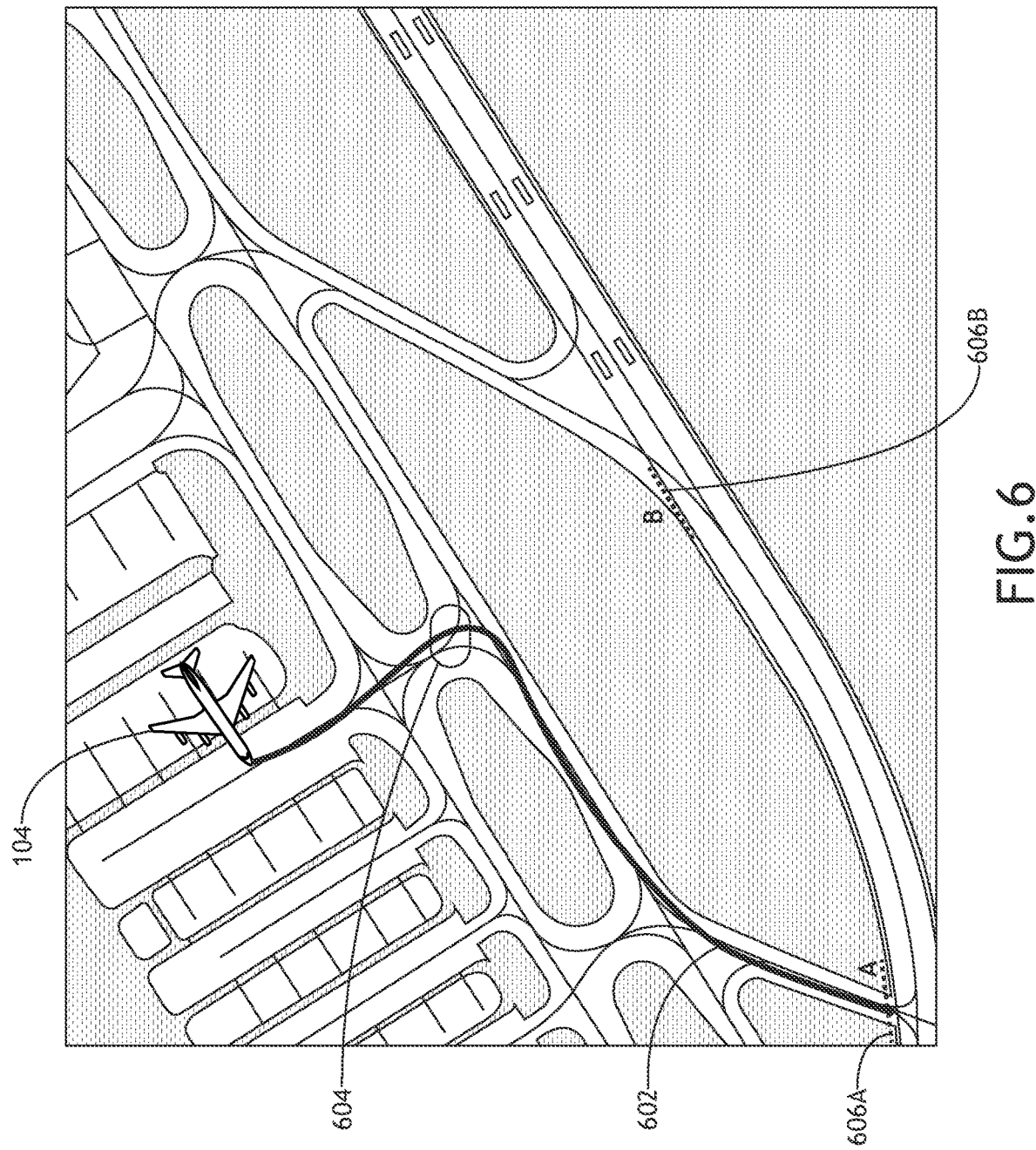
FIG. 6 is a further exemplary view of an AMM of an exemplary embodiment according to the inventive concepts disclosed herein.
Figure 7:
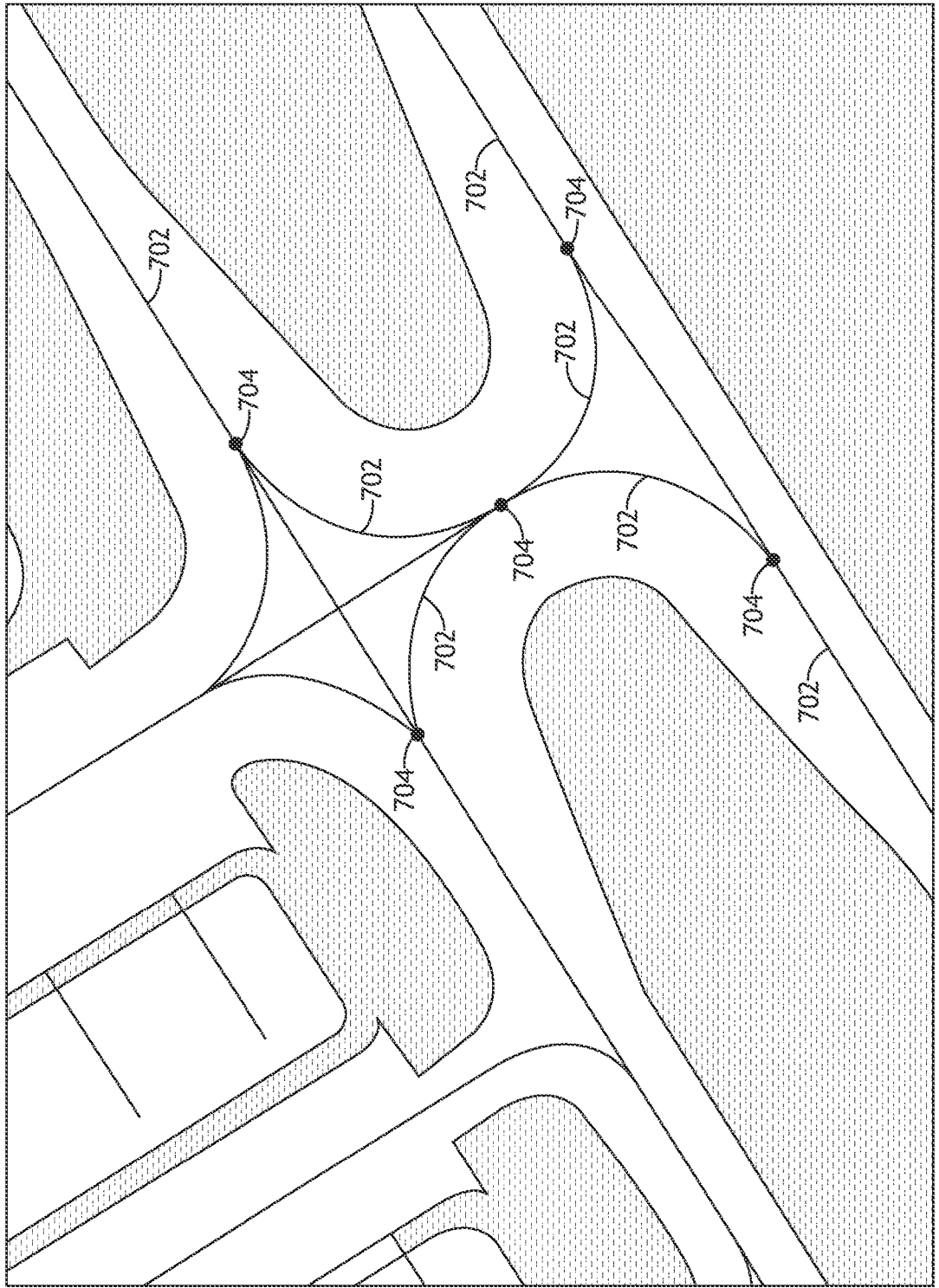
FIG. 7 is a further exemplary view of an AMM of an exemplary embodiment according to the inventive concepts disclosed herein.

Referring now to FIGS. 6-7, an exemplary embodiment of exemplary views of the AMM for an exemplary situation according to the inventive concepts disclosed herein is depicted. As shown in FIG. 6, the AMM shows the aircraft 104, a taxi route 602 (e.g., an instructed taxi route or a predicted taxi route), and runway boundaries 606A, 606B. As shown in FIG. 7, the AMM shows edges 702 and nodes 704. As shown in FIG. 6, the aircraft 104 may follow the taxi route 602. The runway boundaries 606A, 606B indicate runway edges. If existing approaching runway logic is used and supposing that the distance requirements are met along the track, the approaching runway alert might be triggered when the aircraft 104 is positioned at or near intersection 604 and the aircraft track is towards (e.g., momentarily towards) the runway boundary 606B. However, with respect to some embodiments, the approaching runway alert would not be annunciated for runway boundary 606B, and instead, would only be triggered when the conditions have been met and the aircraft is approaching runway boundary 606A.

Figure 8:
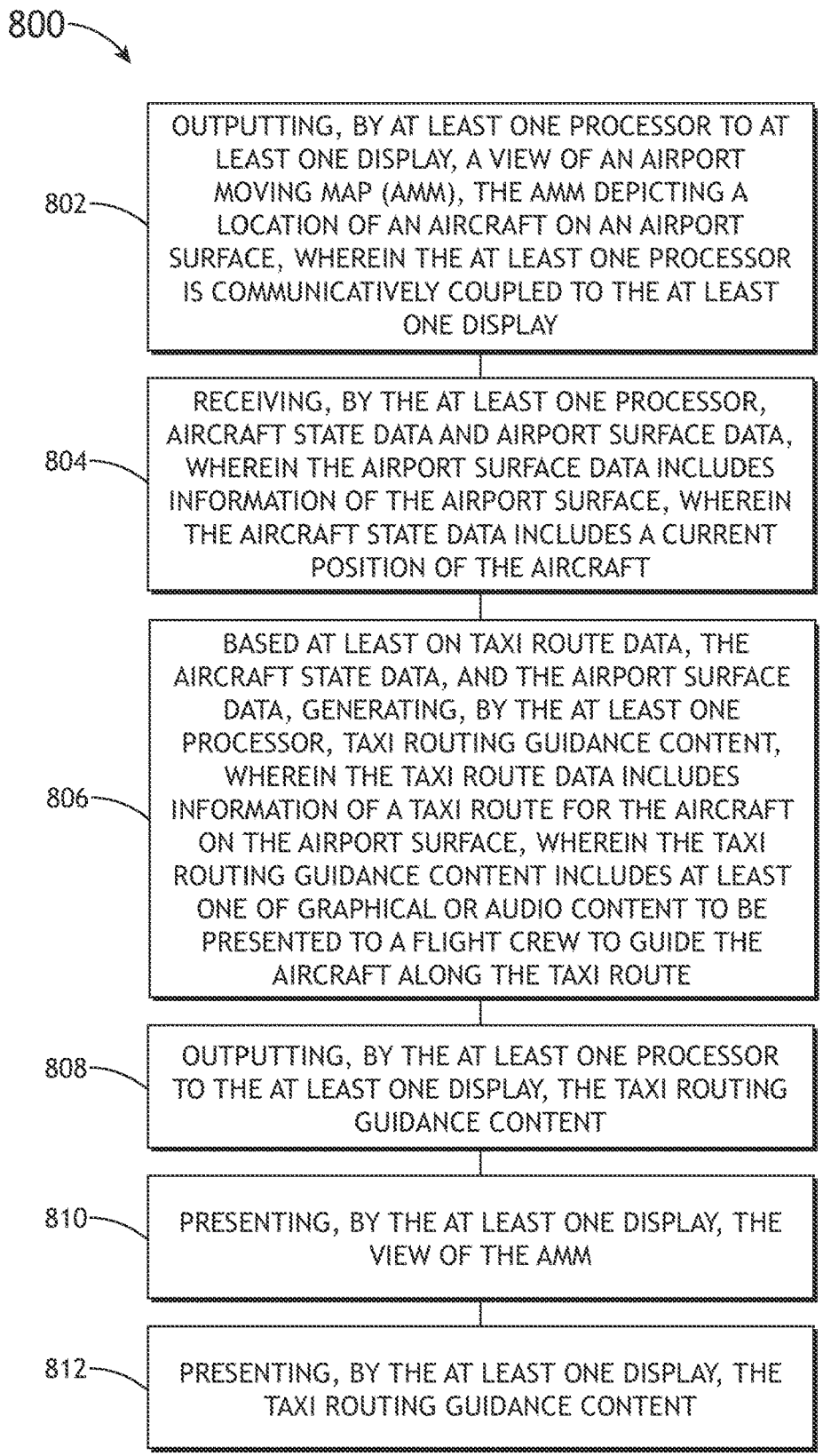
FIG. 8 is a diagram of an exemplary embodiment of a method according to the inventive concepts disclosed herein.

Referring now to FIG. 8, an exemplary embodiment of a method 800 according to the inventive concepts disclosed herein may include one or more of the following steps. Additionally, for example, some embodiments may include performing one or more instances of the method 800 iteratively, concurrently, and/or sequentially. Additionally, for example, at least some of the steps of the method 800 may be performed in parallel and/or concurrently. Additionally, in some embodiments, at least some of the steps of the method 800 may be performed non-sequentially.

A step 802 may include outputting, by at least one processor to at least one display, a view of an airport moving map (AMM), the AMM depicting a location of an aircraft on an airport surface, wherein the at least one processor is communicatively coupled to the at least one display.

A step 804 may include receiving, by the at least one processor, aircraft state data and airport surface data, wherein the airport surface data includes information of the airport surface, wherein the aircraft state data includes a current position of the aircraft.

A step 806 may include based at least on taxi route data, the aircraft state data, and the airport surface data, generating, by the at least one processor, taxi routing guidance content, wherein the taxi route data includes information of a taxi route for the aircraft on the airport surface, wherein the taxi routing guidance content includes at least one of graphical or audio content to be presented to a flight crew to guide the aircraft along the taxi route.

A step 808 may include outputting, by the at least one processor to the at least one display, the taxi routing guidance content.

A step 810 may include presenting, by the at least one display, the view of the AMM.

A step 812 may include presenting, by the at least one display, the taxi routing guidance content.

Further, the method 800 may include any of the operations disclosed throughout.

As will be appreciated from the above, embodiments of the inventive concepts disclosed herein may be directed to a system and a method configured to present a view of an AMM and taxi routing guidance content.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
at least one display; and
at least one processor communicatively coupled to the at least one display, the at least one processor configured to:
output, to the at least one display, a view of an airport moving map (AMM), the AMM depicting a location of an aircraft on an airport surface;
receive aircraft state data and airport surface data, wherein the airport surface data includes information of the airport surface and information of nodes and edges associated with the airport surface, wherein the aircraft state data includes a current position of the aircraft;
determine possible valid maneuvers for possible valid taxi routes at least by: following first edges connected to at least one proximate node proximate to the current position of the aircraft and subsequent edges connected back to at least one of the first edges via intervening edges such that the possible valid taxi routes are formed; computing at least one metric for each of the possible valid taxi routes, wherein the at least one metric includes at least one of a total distance of a given possible valid taxi route or a total estimated time to traverse the given possible valid taxi route; and avoiding any edges of the edges that would cause the aircraft to traverse a given node a second time; wherein the nodes include said at least one proximate node and said given node, wherein the edges include said first edges, said subsequent edges, and said intervening edges;
determine a predicted taxi route based at least on the airport surface data, ownship data parameters, and the determination of the possible valid maneuvers for the possible valid taxi routes based at least on the at least one proximate node proximate to the current position of the aircraft, wherein taxi route data includes the predicted taxi route, wherein the ownship data parameters include the current position of the aircraft, a ground speed of the aircraft, a direction of the aircraft, a size of the aircraft, a weight of the aircraft, an aircraft category of the aircraft, and common routes taken by other aircraft of a same category as the aircraft, wherein the aircraft category of the aircraft is military aircraft, general aviation aircraft, business aircraft, carrier specific aircraft, or cargo aircraft;
based at least on the predicted taxi route of the taxi route data, on the aircraft state data, and on the airport surface data, generate taxi routing guidance content, wherein the taxi route data includes information of the predicted taxi route for the aircraft on the airport surface, wherein the taxi routing guidance content includes at least one of graphical or audio content to be presented to a flight crew to guide the aircraft along the predicted taxi route, wherein the taxi routing guidance content further includes at least one approaching runway annunciation along the predicted taxi route, wherein each of the at least one approaching runway annunciation indicates that the aircraft is approaching a runway; and output, to the at least one display, the taxi routing guidance content;

wherein the at least one display is configured to:
present the view of the AMM; and
present the taxi routing guidance content.

2. The system of claim 1, wherein the aircraft state data further includes a ground speed and a direction.

3. The system of claim 1, wherein the airport surface includes parallel runways, wherein the predicted taxi route includes at least one curve.

4. The system of claim 3, wherein the at least one approaching runway annunciation ignores a given runway in front of the aircraft if the given runway is not along the predicted taxi route.

5. The system of claim 1, wherein the predicted taxi route is instructed by ground control.

6. The system of claim 1, wherein the at least one processor is further configured to determine the possible valid maneuvers for the possible valid taxi routes at least further by: only following edges within bounds of the aircraft's orientation and maneuvering capabilities; and determining whether each of the possible valid taxi routes would trigger an approaching runway alert, wherein triggering the approaching runway alert occurs if (a) a cumulative route length of a given possible valid taxi route exceeds a defined threshold distance or (b) a cumulative time-to-intercept for the given possible valid taxi route exceeds a defined threshold duration.

7. The system of claim 1, wherein the at least one processor is further configured to determine the predicted taxi route at least further by: comparing possible valid taxi routes to a predetermined list of typically used taxi routes.

8. The system of claim 1, wherein the at least one processor is further configured to determine the predicted taxi route at least further by: using at least one of artificial intelligence, neural network, or machine learning operations.

9. The system of claim 1, wherein the ownship data parameters further include the braking parameters of the aircraft.

10. A method, comprising:
outputting, by at least one processor to at least one display, a view of an airport moving map (AMM), the AMM depicting a location of an aircraft on an airport surface, wherein the at least one processor is communicatively coupled to the at least one display;
receiving, by the at least one processor, aircraft state data and airport surface data, wherein the airport surface data includes information of the airport surface and information of nodes and edges associated with the airport surface, wherein the aircraft state data includes a current position of the aircraft;
determining, by the at least one processor, possible valid maneuvers for possible valid taxi routes at least by: following first edges connected to at least one proximate node proximate to the current position of the aircraft and subsequent edges connected back to at least one of the first edges via intervening edges such that the possible valid taxi routes are formed; computing at least one metric for each of the possible valid taxi routes, wherein the at least one metric includes at least one of a total distance of a given possible valid taxi route or a total estimated time to traverse the given possible valid taxi route; and avoiding any edges of the edges that would cause the aircraft to traverse a given node a second time; wherein the nodes include said at least one proximate node and said given node, wherein the edges include said first edges, said subsequent edges, and said intervening edges;
determining, by the at least one processor, a predicted taxi route based at least on the airport surface data, ownship data parameters, and the determination of the possible valid maneuvers for the possible valid taxi routes based at least on the at least one proximate node proximate to the current position of the aircraft, wherein taxi route data includes the predicted taxi route, wherein the ownship data parameters include the current position of the aircraft, a ground speed of the aircraft, a direction of the aircraft, a size of the aircraft, a weight of the aircraft, an aircraft category of the aircraft, and common routes taken by other aircraft of a same category as the aircraft, wherein the aircraft category of the aircraft is military aircraft, general aviation aircraft, business aircraft, carrier specific aircraft, or cargo aircraft;
based at least on the predicted taxi route of the taxi route data, on the aircraft state data, and on the airport surface data, generating, by the at least one processor, taxi routing guidance content, wherein the taxi route data includes information of the predicted taxi route for the aircraft on the airport surface, wherein the taxi routing guidance content includes at least one of graphical or audio content to be presented to a flight crew to guide the aircraft along the predicted taxi route, wherein the taxi routing guidance content further includes at least one approaching runway annunciation along the predicted taxi route, wherein each of the at least one approaching runway annunciation indicates that the aircraft is approaching a runway;
outputting, by the at least one processor to the at least one display, the taxi routing guidance content;
presenting, by the at least one display, the view of the AMM; and
presenting, by the at least one display, the taxi routing guidance content.

* * * * *